United States Patent
Lim et al.

(10) Patent No.: US 8,472,084 B2
(45) Date of Patent: Jun. 25, 2013

(54) IMAGE PROCESSING APPARATUS OPTIMIZING INFORMATION AND CONTROL METHOD THEREOF

(75) Inventors: Sung Hyun Lim, Seoul (KR); Hyung Soo Ohk, Seoul (KR); Hyeon Seok Seo, Incheon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 740 days.

(21) Appl. No.: 12/026,017

(22) Filed: Feb. 5, 2008

(65) Prior Publication Data
US 2008/0187171 A1 Aug. 7, 2008

(30) Foreign Application Priority Data
Feb. 6, 2007 (KR) .................. 10-2007-0012153

(51) Int. Cl.
*H04N 1/32* (2006.01)
*G06T 2201/0051* (2006.01)

(52) U.S. Cl.
USPC .......................................... 358/3.28; 382/100

(58) Field of Classification Search
None
See application file for complete search history.

(56) References Cited

U.S. PATENT DOCUMENTS

| | | | |
|---|---|---|---|
| 5,206,681 A | 4/1993 | Otomo et al. | |
| 6,304,345 B1 * | 10/2001 | Patton et al. | 358/527 |
| 8,045,235 B2 * | 10/2011 | Nakai et al. | 358/3.28 |
| 2004/0150859 A1 * | 8/2004 | Hayashi | 358/3.28 |
| 2004/0257625 A1 * | 12/2004 | Tonami | 358/3.28 |
| 2005/0123194 A1 | 6/2005 | Fan et al. | |
| 2006/0256362 A1 * | 11/2006 | Guan et al. | 358/1.14 |
| 2006/0261168 A1 * | 11/2006 | Bybell et al. | 235/462.16 |

FOREIGN PATENT DOCUMENTS

| | | |
|---|---|---|
| CN | 1684490 A | 10/2005 |
| JP | 833162 | 12/1996 |
| JP | 11298729 | 10/1999 |
| JP | 2000-278533 | 10/2000 |
| KR | 2006-64984 | 6/2006 |

OTHER PUBLICATIONS

Chinese Fourth Office Action dated Aug. 3, 2012 in co-pending application No. 200810095143.X.

\* cited by examiner

*Primary Examiner* — Barbara Reinier
(74) *Attorney, Agent, or Firm* — Staas & Halsey LLP

(57) ABSTRACT

An image processing apparatus and a control method thereof. Information of image processing parameters, such as halftoning, edge emphasis, color correction, and gamma correction, is inserted into the document to be printed in the form of the watermark during the printing work. Thus, when the user wants to copy the printed document, the information of the image processing parameters used for printing the document is optimized suitable for the copy by detecting the watermark inserted into the printed document, thereby improving the quality of the copy. The method includes inserting first information of image processing parameters, which are used to print the document, into the document when printing the document, and optimizing second information of image processing parameters to be used for copying the document using the first information of image processing parameters inserted into the document when copying the document.

13 Claims, 9 Drawing Sheets

| PARAMETER TYPE | PARAMETER VALUE | CORRESPONDING VALUE |
|---|---|---|
| HALFTONING | 150Lpi, line dither | 3 |
| EDGE EMPHASIS | Max sharpening | 4 |
| COLOR CORRECTION | Vivid | 5 |
| GAMMA CORRECTION | Light text | 16 |

Fig. 5

| PARAMETER TYPE | PARAMETER VALUE | CORRESPONDING VALUE |
|---|---|---|
| HALFTONING | 150Lpi, line dither | 3 |
| EDGE EMPHASIS | Max sharpening | 4 |
| COLOR CORRECTION | Vivid | 5 |
| GAMMA CORRECTION | Light text | 16 |

Fig. 6

| 3 → HALFTONING : 150Lpi, line dither |
| --- |
| 4 → EDGE EMPHASIS : Max sharpening |
| 5 → COLOR CORRECTION : Vivid |
| 16 → GAMMA CORRECTION : Light text |

Fig. 7

| HALFTONING | 150Lpi, line dither → De-screening window : 5× 5 mask |
|---|---|
| EDGE EMPHASIS | Max sharpening → 2 |
| COLOR CORRECTION | Vivid → more naturally |
| GAMMA CORRECTION | Light text → a little bit darker |

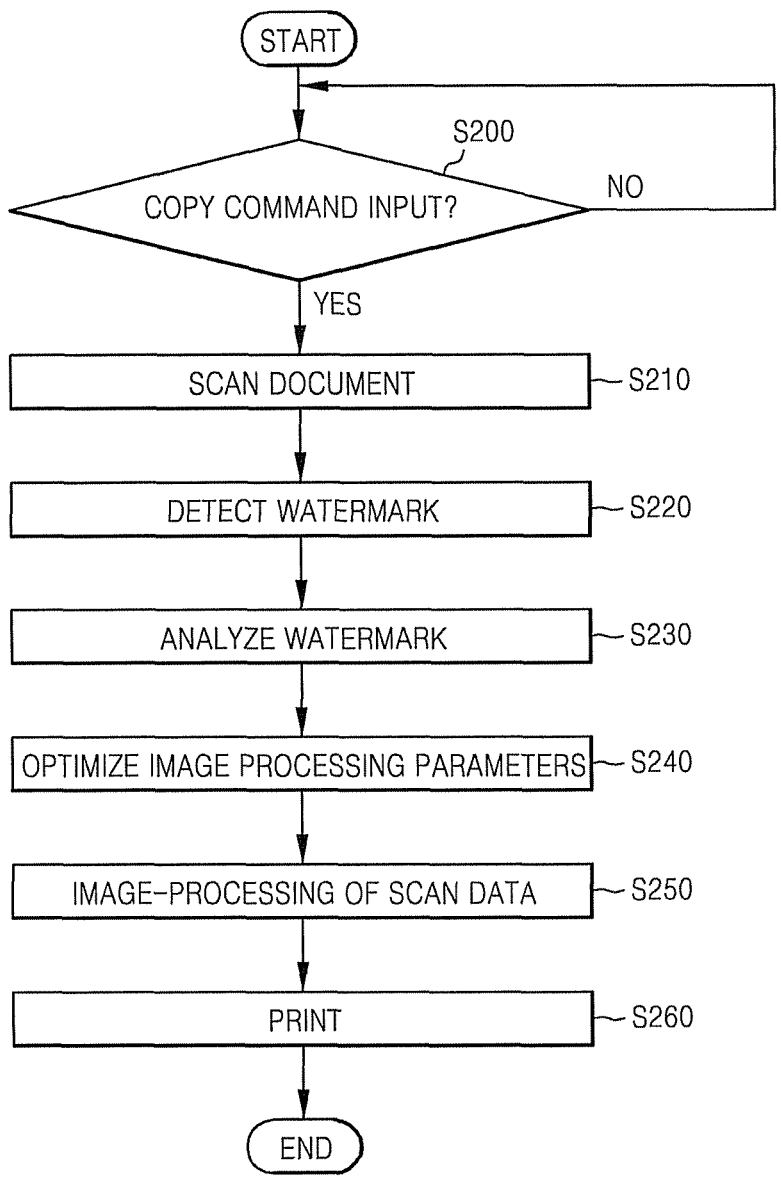

IMAGE PROCESSING APPARATUS OPTIMIZING INFORMATION AND CONTROL METHOD THEREOF

CROSS-REFERENCE TO RELATED APPLICATION

This application claims the benefit of Korean Patent Application No. 2007-12153, filed in the Korean Intellectual Property Office on Feb. 6, 2007, the disclosure of which is incorporated herein by reference.

BACKGROUND OF THE INVENTION

1. Field of the Invention

Aspects of the present invention relate generally to an image processing apparatus and a control method thereof, and more particularly to an image processing apparatus and a control method thereof, capable of improving quality of copies when copying documents in the image processing apparatus.

2. Description of the Related Art

An image processing apparatus outputs copies of films, photos, documents, drawings, etc. Examples of image processing apparatuses include a copy machine having printing and scanning functions, a printer, a facsimile machine, a scanner, and a multi-function peripheral (MFP). During printing work, the image processing apparatus processes segments of characters, photos, graphic charts, and the like contained in the documents using image processing parameters stored in a look-up table, such as halftoning, edge emphasis, color correction, gamma correction, etc., thereby reproducing segments having an image quality similar to that of original segments.

However, since it is difficult to set the image processing parameters by taking all segments of the documents into consideration during the printing work, the image processing parameters are normally set such that the photos can be primarily and clearly printed. In this case, remaining segments may be represented with relatively unclear or dim images. In order to compensate for this problem, the image processing parameters are set such that the remaining segments have higher brightness.

After printing the document, the user may choose to copy the document again. However, if the document is copied according to the above-mentioned scheme, the quality of the copy may be degraded.

SUMMARY OF THE INVENTION

Aspects of the present invention provide an image processing apparatus and a control method thereof capable of improving quality of copies by utilizing information of image processing parameters used in printing work when copying documents in the image processing apparatus.

According to an aspect of the present invention, a method of controlling an image processing apparatus that processes a document using image processing parameters when printing and copying the document is provided. The method comprises the inserting first information of image processing parameters, which are used to print the document, into the document when printing the document; and optimizing second information of image processing parameters to be used for copying the document by using the first information of image processing parameters inserted into the document when copying the document.

According to another aspect of the present invention, an image processing apparatus is provided. The image processing apparatus comprises a watermark generator to generate a watermark including first information of image processing parameters used to print a document, a watermark detector to detect the watermark, a watermark analyzer to analyze the detected watermark, and an image processing controller to control the watermark generator to generate the watermark and to insert the watermark into the document when printing the document, to control the watermark detector and the watermark analyzer to detect and analyze the watermark when copying the document so as to obtain second information of the image processing parameters used for printing the document, and to optimize the image processing parameters to be used to copy the document by using the obtained first information of the image processing parameters.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 5 is a table illustrating information of image processing parameters contained in the watermark shown in FIG. 4;

FIG. 6 is a table illustrating information of image processing parameters analyzed by the watermark analyzer shown in FIG. 2;

FIG. 7 is a table illustrating a process for optimizing information of image processing parameters in an image processing controller shown in FIG. 2;

FIG. 9 is a flowchart illustrating a procedure for copying a document by optimizing image processing parameters when copying the document in an image processing apparatus according to an embodiment of the present invention.

DETAILED DESCRIPTION OF THE EMBODIMENTS

Figure 1:
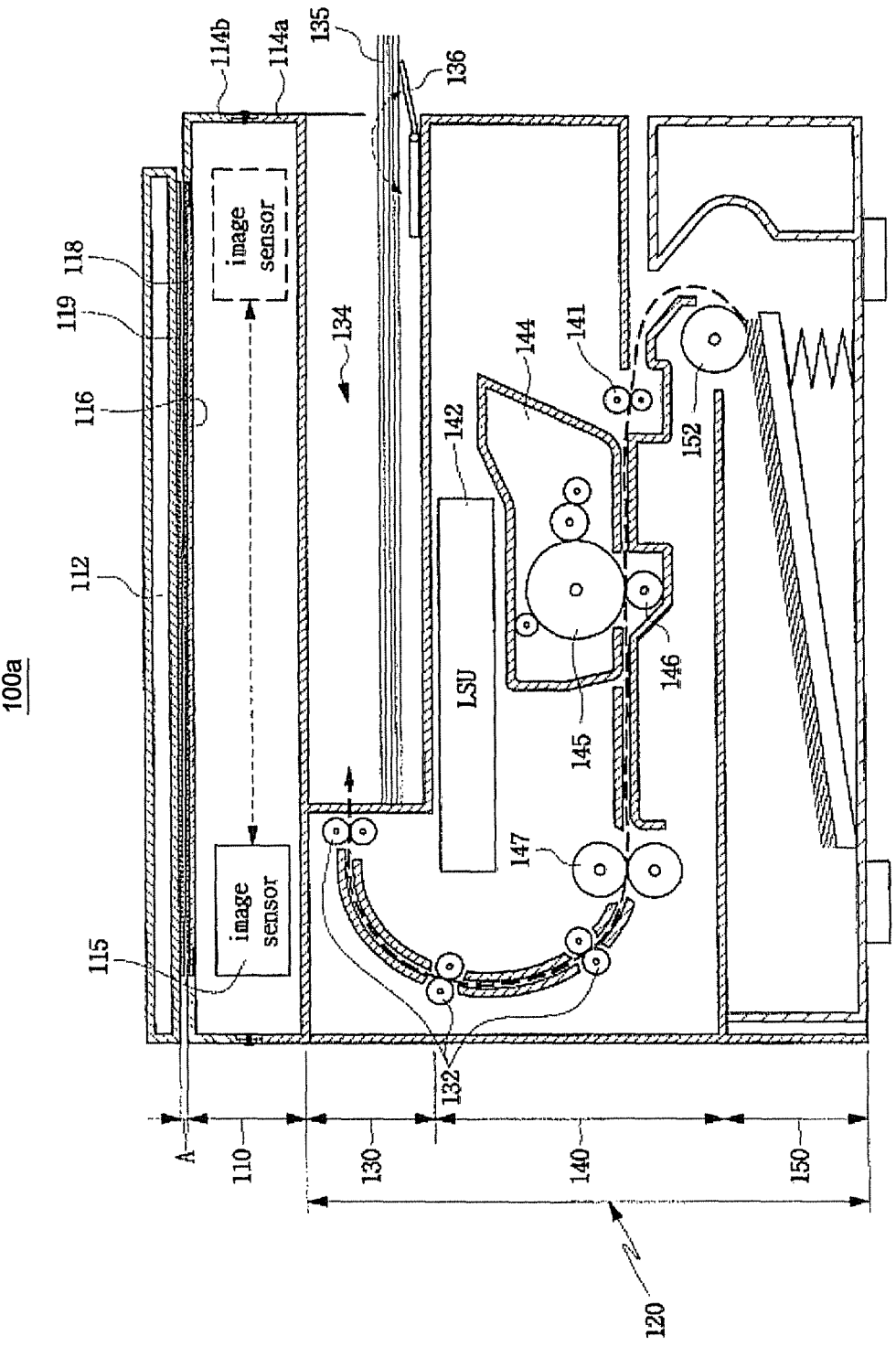
FIG. 1 is a schematic view illustrating the structure of an image processing apparatus according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a schematic view illustrating the structure of an image processing apparatus 100a according to an embodiment of the present invention. The image processing apparatus 100a includes a scan unit 110 provided at an upper portion of the image processing apparatus so as to scan an image formed on a document 118, and a print engine unit 120 provided at a lower portion of the image processing apparatus so as to print the scanned image on a printable medium 135. According to other aspects of the invention, the image processing apparatus 100a may include additional and/or different components. The image processing apparatus 100a may be a printer, a scanner, a copier, a facsimile machine, or a multi-function device. The printable medium may be any medium onto which an image or text may be printed, such as paper or transparent film. As used herein, the term "paper" also refers to other types of printable media.

The scan unit 110 includes a document table 114 having a cavity therein, a glass 116 installed at an upper portion of the document table 114 such that the document 118 to be read can be loaded thereon, a platen cover 112 for pushing the document 118 loaded on the glass 116, and an image sensor 115, which is installed below the glass 116 and moves in left and right directions within a predetermined period so as to read out the image formed on the document 118. The scan unit may include additional and/or different components, depending on the technology employed. For example, the scan unit 110 may be a drum-type scan unit or a handheld scan unit. The image sensor 115 includes a CIS (CMOS image sensor) or a CCD (charge coupled device). The image sensor 115 coverts an optical signal into an electric signal and enables the print engine unit 120 to print out the image.

The print engine unit 120 has a body formed therein with a paper transferring route to transfer the printable medium. The print engine unit 120 includes a paper storage part 150 for feeding printable media to the body, a print part 140 for printing the image on the printable medium being transferred, and a paper discharge part 130 for discharging the printable medium printed with the image to the exterior. The print part 140 receives the image from the scan unit 110 in order to form and fix the image on the printable medium. The print part 140 includes a photoconductor 145 rotatably installed in the print part 140, a laser scanning unit (LSU) 142 that receives the image from the scan unit 110 so as to form an electrostatic latent image on the photoconductor 145, a developer 144 for converting the electrostatic latent image formed by the LSU 142 into a visible image using toner, a transfer unit 146 for transferring the developed image on the printable medium, and a fixing unit 147 that applies heat and pressure to the printable medium such that the transferred image can be fixed on the printable medium. Again, the print part 140 may include additional or different components, depending on the technology employed in the print part. For example, the print part 140 that is an ink-jet type print part may include different components.

The paper discharge part 130 discharges and stores the printable medium 135 when printing work for the printable medium 135 has been finished. The paper discharge part 130 includes a paper discharge tray 136 supporting the discharged printable media 135.

The image processing apparatus 100a operates as follows. First, the document 118 to be copied is placed on the glass 116 and the platen cover 112 is closed. The user may arrange the document differently depending on the technologies employed by the image processing apparatus 100a. The user sets the copy condition, such as the number of copies, and then pushes a start key. The image sensor 115, which is a reading unit provided in the scan unit 110, reads out the contents of the document 118 according to the density of optical energy, converts the data into electric signals, and transmits the electric signals to the image processing controller that controls the operation of the image processing apparatus 100a. Upon receiving the electric signals from the image sensor 115, the image processing controller sends a copy command to the LSU 142, so that the photoconductor 145 is exposed to light.

If the latent image is formed on the photoconductor 145 through the exposure process, powder-type toner is transferred to the photoconductor 145 between a developing roller of the developer 144 and the photoconductor 145. The latent image is transferred onto the printable medium, which is moved to the transfer unit 146, by applying high pressure onto the printable medium.

The fixing unit 147 fixes fine toner onto the printable medium by applying high pressure and high temperature to the printable medium, and the printable medium 135 is discharged by the paper discharge roller 132. The discharged printable medium 135 is stacked on a paper stack 134 installed between the scan unit 110 and the print engine unit 120. The paper storage part 150 stores a plurality of printable media, which are transferred to the transfer unit 146 through a conveying roller 141 while being separated from each other by a pickup roller 152.

Figure 2:
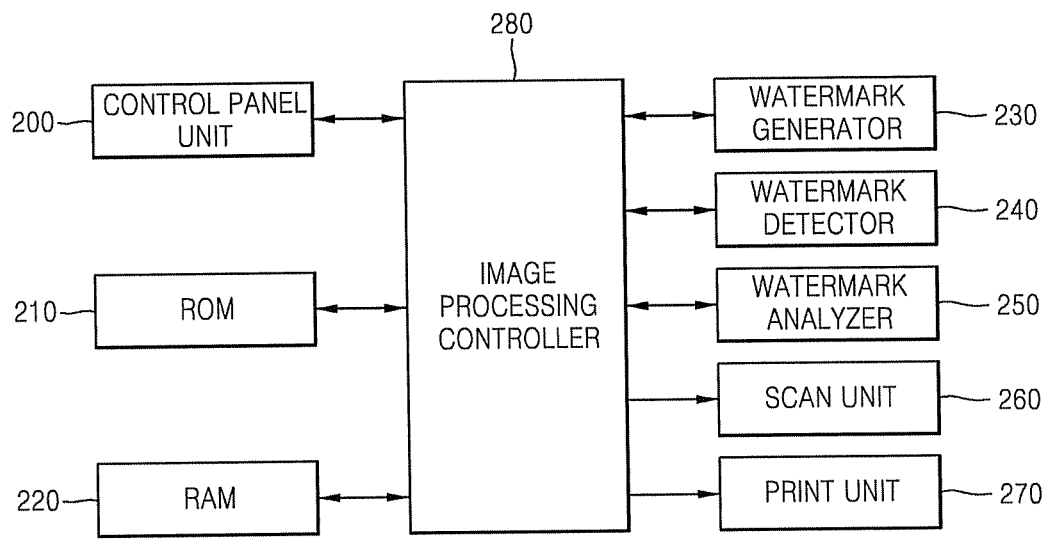
FIG. 2 is a schematic block view illustrating the structure of an image processing apparatus according to an embodiment of the present invention.

FIG. 2 is a schematic block view illustrating the structure of an image processing apparatus 100b according to an embodiment of the present invention. The image processing apparatus 100b includes a control panel unit 200, a ROM (random only memory) 210, a RAM (random access memory) 220, a watermark generator 230, a watermark detector 240, a watermark analyzer 250, a scan unit 260, a print unit 270, and an image processing controller 280. The image processing apparatus 100b may also include a transmission unit (not shown) to transmit the processed image to an image forming apparatus for printing. The transmission unit may be included in the image processing apparatus 100b in addition to, or in lieu of, the print unit 270, and may transmit the image in a wired or wireless fashion using any known standard, such as USB, Firewire (IEEE 1394), Ethernet, Wi-Fi, or the like.

The control panel unit 200 includes a control panel and an LCD panel. The user's command, which is input through the control panel, is transferred to the image processing controller so that the state of the image processing apparatus is displayed on the LCD panel according to the control signal of the image processing controller 250.

The ROM 210 is a nonvolatile memory; content stored in the ROM 210 may be maintained even if the image forming apparatus 100b is powered off. The ROM 210 has a control program, such as an operating system (OS), required to realize the function of the image forming apparatus. The RAM 220 is a nonvolatile memory, which stores various data generated while the programs are being executed. The ROM 210 and RAM 220 are examples of a storage unit.

Figure 3:
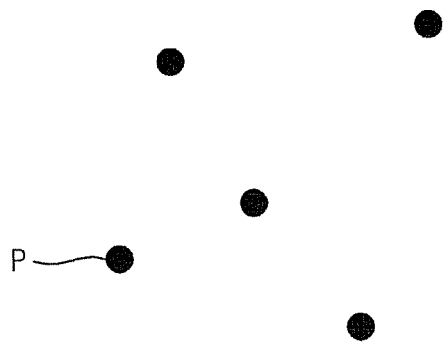
FIG. 3 is a view illustrating a watermark generated by the watermark generator shown in FIG. 2.
Figure 4:
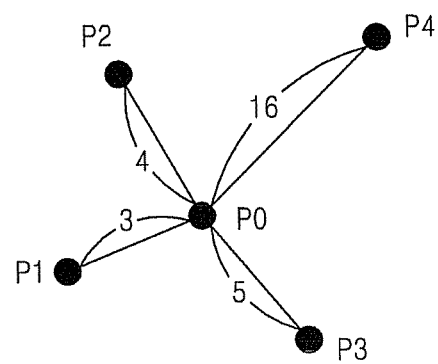
FIG. 4 is a view illustrating the watermark pattern shown in FIG. 3.

The watermark generator 230 generates the watermark. As shown in FIG. 3, the watermark may comprise several points P. As shown in FIG. 4, such a watermark includes a plurality of points P1, P2, P3 and P4 aligned around a reference point P0. The points P1, P2, P3 and P4 represent the type of the image processing parameters, and the distance between the reference point P0 and each point P1, P2, P3 and P4 represents the value of the image processing parameter. For example, P1 may represent halftoning, P2 may represent edge emphasis, P3 may represent color correction, and P4 may represent gamma correction. In addition, the distance between the reference point P0 and each point P1, P2, P3 and P4 indicates the value corresponding to each image processing parameter, as shown in FIG. 5. This watermark is inserted into the document when printing the document, which will be described later.

The points P1-P5 may be arranged around the reference point P0 in any fashion. For example, FIGS. 3 and 4 show the points P1-P5 arranged around the reference point P0 in a hub-and-spoke pattern, with the reference point P0 at the hub. However, according to other aspects of the invention, the points P1-P5 may be arranged around the reference point P0 in any fashion, such as in a straight line, a star pattern, or in two straight lines. Similarly, the number of points may vary depending on the number of image parameters being recorded.

The watermark detector 240 detects a watermark inserted into the document during the printing process. The watermark is aligned in a previously assigned position of the document, so that the watermark can be detected according to a watermark detection rule that has been previously determined.

The watermark analyzer 250 analyzes the watermark detected by the watermark detector 240. The watermark analyzer 250 obtains information of the image processing parameters based on the distance between the reference point P0 and each point P1, P2, P3 and P4 in the detected watermark. As shown in FIG. 6, if the distance between the reference point P0 and the point P1 is 3, the halftoning is determined to be "150Lpi, line dither". If the distance between the reference point P0 and the point P2 is 4, the edge emphasis is determined to be "Max sharpening". If the distance between the reference point P0 and the point P3 is 5, the color correction is determined to be "vivid", and if the distance between the reference point P0 and the point P4 is 16, the gamma correction is determined to be "Light text".

The scan unit 260 moves the image sensor 115 in one direction so as to scan the image of a scan subject. The print unit 270 prints the data received from the scan unit 260 onto a printable medium.

The image processing controller 280 controls the operation of the image processing apparatus. During the printing, the image processing controller 280 processes the print data contained in the documents using image processing parameters stored in the look-up table. The image processing parameters may be at least one of halftoning, edge emphasis, color correction, and gamma correction, although additional and/or different parameters may also be used as an image processing parameter. As used herein, the term "at least one of . . . and" a list of elements indicates one or more of the elements included in the list, i.e., any subset of the elements included in the list. The processed information of the image processing parameters is generated in the form of the watermark by the watermark generator 230. This watermark is inserted into the document when the document is printed.

When copying the document having the watermark, the image processing controller 280 scans the document and detects the watermark from the scan data using the watermark detector 240. The detected watermark is analyzed by the watermark analyzer 250 to obtain the information about the image processing parameters, such as the type and the value of the parameters. The image processing parameters are optimized such that the quality of the copy document can be improved, and the scan data is image-processed based on the optimized image processing parameters. After the scan data has been image-processed, the scan data is printed. In order to optimize the image processing parameters, as shown in FIG. 7, the halftoning is corrected from "150Lpi, line dither" to "De-screening window, 5×5 mask", the edge emphasis is corrected from "Max sharpening" to "2", the color correction is corrected from "vivid" to "more naturally", and the gamma correction is corrected from 'Light text" to "a little bit darker".

Figure 8:
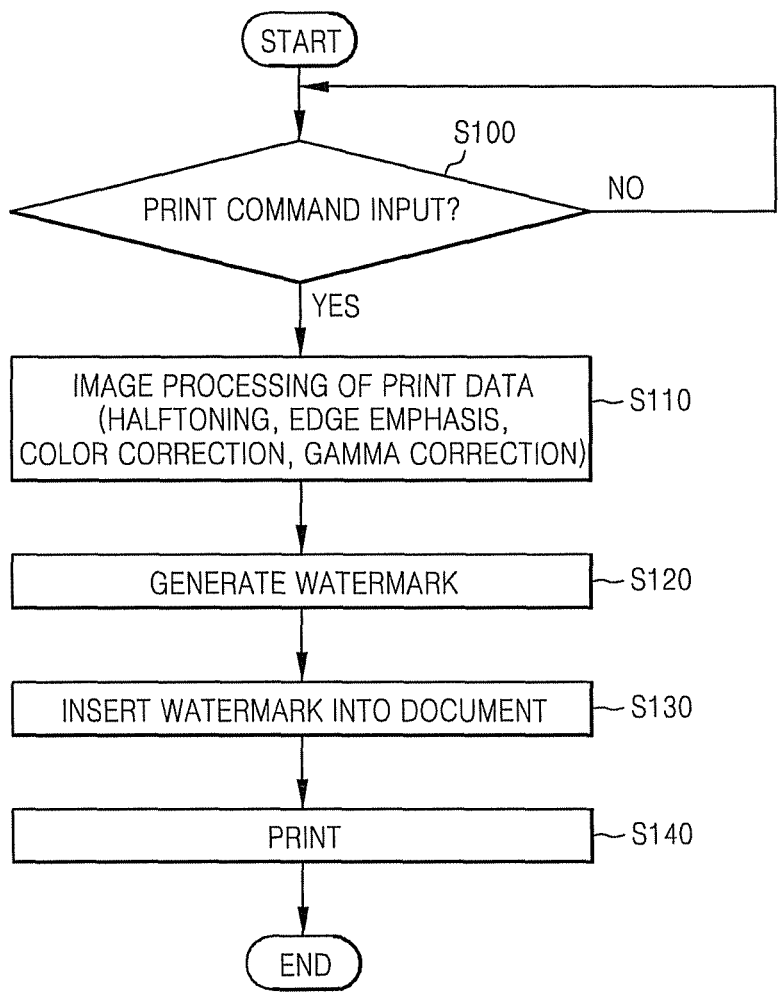
FIG. 8 is a flowchart illustrating a procedure for inserting a watermark including image processing parameters into a document when printing the document in an image processing apparatus according to an embodiment of the present invention.

FIG. 8 is a flowchart illustrating a procedure for inserting the watermark including the image processing parameters into the document when printing the document in the image processing apparatus 100b according to an embodiment of the present invention. The image processing controller 280 determines whether the printing command has been input in operation S100. If the printing command has been input, the print data is image-processed in operation S110 using the image processing parameters stored in the look-up table, such as halftoning, edge emphasis, color correction, gamma correction, etc.

The watermark generator 230 creates the watermark using the information of the image processing parameters used for processing the print data at operation S120. This watermark is inserted into the document in operation S130, and the document having the watermark is printed in operation S140.

FIG. 9 is a flowchart illustrating a procedure for copying the document by optimizing the image processing parameters when copying the document in the image processing apparatus 100b. When copying the document having the watermark including information of the image processing parameters, the image processing controller 280 determines whether the copy command has been input in operation S200. If the copy command has been input, the document is scanned by means of the scan unit 260 in operation S210.

The watermark inserted into the document is detected by the watermark detector 240 in operation S220. The watermark analyzer 250 analyzes the watermark in operation S230. As described above, the information of the image processing parameters is obtained based on the distance between the reference point P0 and each point P1, P2, P3 and P4.

After obtaining the information of the image processing parameters based on the analysis result of the watermark, the information of the image processing parameters is analyzed and optimized in operation S240 such that the document can be printed with superior quality. As mentioned above, parameter values of the halftoning, edge emphasis, color correction, and gamma correction are corrected into predetermined parameter values, which are preset through experiment, thereby optimizing the image processing parameters to improve the quality of the copy.

The scan data is image-processed using the optimized image processing parameters in operation S250. In operation S260, the scan data is printed onto a printable medium.

Aspects of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CDs and DVDs; magneto-optical media such as optical disks; and hardware devices that are specially configured to store and perform program instructions, such as read-only memory (ROM), random access memory (RAM), flash memory, and the like; and a computer data signal embodied in a carrier wave comprising a compression source code segment and an encryption source code segment (such as data transmission through the Internet). The computer readable recording medium can also be distributed over network coupled computer systems so that the computer readable code is stored and executed in a distributed fashion. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

As described above, according to aspects of the present invention, information of the image processing parameters, such as halftoning, edge emphasis, color correction, and gamma correction, is inserted into the document to be printed in the form of the watermark during the printing work. Thus, when the user wants to copy the printed document, the information of the image processing parameters used for printing the document is optimized for the copy by detecting the watermark inserted into the printed document, thereby improving the quality of the copy.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of controlling an image processing apparatus that processes a document using image processing parameters when printing and copying the document, the method comprising:
   inserting first information of each of a plurality of image processing parameters, which are used to print the document, into the document when printing the document in the form of a watermark; and
   optimizing the first information of the image processing parameters as second information of the image processing parameters for use during copying the document,
   wherein the first information is inserted into the document in the form of a watermark, and the watermark includes a reference point and a plurality of points,
   wherein each of the plurality of points representing a different type of image processing parameter used to print the document, and an angular relationship of the reference point and each of the plurality of points being determined by a previously determined watermark detection rule,
   wherein a linear distance between the reference point and each of the plurality of points represents a parameter value corresponding to the respective one of the image processing parameters and representative of determined type of parameter, and
   wherein a first linear distance between the reference point and a selected one of the plurality of points represents a first value of one of the parameters of a certain type and a different second linear distance between the reference point and the selected one of the plurality of points represents a different second value of the same one of the parameters of the same type.

2. The method as claimed in claim 1, wherein the image processing parameters include at least one of halftoning, edge emphasis, color correction, and gamma correction.

3. The method as claimed in claim 2, wherein the optimizing of the first information resulting in the second information comprises correcting the parameter values of the image processing parameters into predetermined values, which have been previously set, using the first information of the image processing parameters inserted into the document.

4. An image processing apparatus comprising:
   a watermark generator to generate a watermark including first information of each of a plurality of image processing parameters used to print a document;
   a watermark detector to detect the watermark;
   a watermark analyzer to analyze the detected watermark; and
   an image processing controller to control the watermark generator to generate the watermark and to insert the watermark into the document when printing the document, to control the watermark detector and the watermark analyzer to detect and analyze the watermark when copying the document so as to obtain the first information of the image processing parameters used for printing the document, and to optimize the first information image processing parameters as second information image processing parameters to be used to copy the document,
   wherein the watermark includes a reference point and a plurality of points,
   wherein each of the plurality of points representing a different type of image processing parameter used to print the document, and an angular relationship of the reference point and each of the plurality of points being determined by a previously determined watermark detection rule,
   wherein a linear distance between the reference point and each of the plurality of points represents a parameter value corresponding to the respective one of the image processing parameters and representative of determined type of parameter, and
   wherein a first linear distance between the reference point and a selected one of the plurality of points represents a first value of one of the parameters of a certain type and a different second linear distance between the reference point and the selected one of the plurality of points represents a different second value of the same one of the parameters of the same type.

5. The image processing apparatus as claimed in claim 4, wherein the image processing parameters include at least one of halftoning, edge emphasis, color correction, and gamma correction.

6. The image processing apparatus as claimed in claim 4, wherein parameter values of the image processing parameters to be used for copying the document are optimized by correcting the parameter values of the image processing parameters into predetermined values, which have been previously set, using the obtained information of the image processing parameters.

7. An image processing apparatus to optimize image processing parameters so as to print a high quality image, the apparatus comprising:
   a scan unit to scan a document having first information about each of a plurality of image processing parameters inserted therein;
   a watermark detector to detect the first information;
   a watermark analyzer to analyze the watermark and to extract the first information about the image processing parameters;
   an image processing controller to optimize the image processing parameters based upon the extracted first information so as to improve the quality of subsequent copies of the document; and
   a print unit to print the document onto a printable medium based on the optimized image processing parameters,
   wherein the watermark generator inserts the information in the form of a watermark comprising a reference point and a plurality of points,
   wherein each of the plurality of points representing a different type of image processing parameter used to print the document, and an angular relationship of the reference point and each of the plurality of points being determined by a previously determined watermark detection rule, wherein a linear distance between the reference point and each of the plurality of points represents a parameter value corresponding to the respective one of the image processing parameters, and wherein a first linear distance between the reference point and a selected one of the plurality of points represents a first value of one of the parameters and a different second linear distance between the reference point and the selected one of the plurality of points represents a different second value of the same one of the parameters.

8. The image processing apparatus of claim 7, further comprising:
   a watermark generator to generate the information about the image processing parameters and to insert the generated information into an image;
   wherein the print unit prints the image onto the printable medium.

9. The image processing apparatus of claim 8, wherein the watermark generator inserts the information into the image at a predetermined position.

10. The image processing apparatus of claim 7, further comprising a storage unit to store the image processing parameters in a look-up table.

11. A method of printing an image onto a printable medium so as to improve the quality of subsequent copies of the printed image, the method comprising:
   determining first information of each of a plurality of image processing parameters to be applied to an image to be printed onto a printable medium so as to improve the quality of subsequent copies of the printed image;
   inserting the first information into the image as a watermark; and
   printing the image containing the first information onto the printable medium,
   wherein the first information comprises a reference point and a plurality of points each corresponding to one of the image processing parameters and an angular relationship of the reference point and each of the plurality of points being determined by a previously determined watermark detection rule,
   wherein a linear distance between each of the plurality of points and the reference points indicates a value of the corresponding to the respective one of the image processing parameters, and
   wherein a first linear distance between the reference point and a selected one of the plurality of points represents a first value of one of the parameters and a different second linear distance between the reference point and the selected one of the plurality of points represents a different second value of the same one of the parameters.

12. A method of determining image processing parameters previously applied to an image printed on a printable medium so as to improve the quality of subsequent copies of the image, the method comprising:
   scanning an image printed onto a printable medium;
   extracting first information from a watermark on each of a plurality of image processing parameters inserted into the image;
   optimizing the image processing parameters so as to improve the quality of subsequent copies of the image, based on the extracted first information; and
   printing a copy of the image onto another printable medium based on the optimized image processing parameters,
   wherein the first information having a reference point and a plurality of points each corresponding to one of the image processing parameters and an angular relationship of the reference point and each of the plurality of points being determined by a previously determined watermark detection rule,
   wherein a linear distance between each of the plurality of points and the reference points indicates a value of the corresponding to the respective one of the image processing parameters, and
   wherein a first linear distance between the reference point and a selected one of the plurality of points represents a first value of one of the parameters and a different second linear distance between the reference point and the selected one of the plurality of points represents a different second value of the same one of the parameters.

13. The method of claim 12, wherein the information is located at a predetermined position on the printable medium.

* * * * *